United States Patent [19]

Beckmann

[11] Patent Number: 5,115,001

[45] Date of Patent: May 19, 1992

[54] VULCANIZABLE RUBBER MIXTURE, VULCANIZED RUBBER MATERIAL AND METHOD OF PRODUCING RUBBER ARTICLES FROM THE VULCANIZABLE RUBBER MIXTURE

[75] Inventor: Otto Beckmann, Traiskirchen, Austria

[73] Assignee: Semperit Reifen Aktiengesellschaft, Traiskirchen, Austria

[21] Appl. No.: 536,282

[22] Filed: Jun. 11, 1990

[30] Foreign Application Priority Data

Jun. 28, 1989 [AT] Austria .................. 1585/89

[51] Int. Cl.$^5$ .................. C08K 7/00; C08K 3/10
[52] U.S. Cl. .................. 524/58; 524/413
[58] Field of Search .................. 524/58, 413

[56] References Cited

U.S. PATENT DOCUMENTS

| 637,018 | 11/1899 | Ostberg | 524/58 |
| 1,796,980 | 3/1931 | Calcott et al. | 524/58 |
| 1,862,270 | 7/1932 | Källner et al. | 524/58 |

FOREIGN PATENT DOCUMENTS

| 0037942 | 10/1981 | European Pat. Off. |  |
| 0039769 | 11/1981 | European Pat. Off. |  |
| 0190398 | 8/1986 | European Pat. Off. |  |
| 1097341 | 5/1986 | Japan | 524/58 |

OTHER PUBLICATIONS

An Improved Wire Adhesion Test Method, Hicks, A. E. et al.; Rubber and Chemistry Technology, vol. 45/1, (1972), pp. 26-48.

Mixture Preparation for Dynamic Adhesion of Rubber to Steel Cord, Wagner, M. P. and Hewitt, N. W.; Kautschuk, Gummi, Kunststoffe; vol. 37, (1984), pp. 688-693.

Steel Cord Bonding Mixtures—Developement, Testing, and Evaluation, Sprung, J. and Burmester, K.; Kautschuk, Gummi, Kunststoffe; vol. 33, (1980), pp. 611-616.

*Carbon Blacks for Rubber*, Bulletin 2; Columbian Division of Cities Service Company, (Jul. 1974).

*Natural Rubber*, by S. T. Semegen & Cheong Sai Fah; Vanderbilt Rubber Handbook, (1978), pp. 18-33.

*Primary Examiner*—Nathan M. Nutter
*Attorney, Agent, or Firm*—Sandler, Greenblum & Bernstein

[57] ABSTRACT

A vulcanizable rubber mixture contains imbedded therein copper alloy based reinforcing elements and forms a durable bond to such copper alloy based reinforcing elements during vulcanization. Therefore, the vulcanizable rubber mixture has added thereto a bonding additive containing at least one monosaccharide which is selected from the group of ketoses. This bonding additive is unobjectionable particularly in toxicological terms and can be admixed and processed without problems. The thus formed vulcanized materials possesses very good characteristics with respect to moisture resistance and oxidative aging.

23 Claims, No Drawings

VULCANIZABLE RUBBER MIXTURE, VULCANIZED RUBBER MATERIAL AND METHOD OF PRODUCING RUBBER ARTICLES FROM THE VULCANIZABLE RUBBER MIXTURE

BACKGROUND OF THE INVENTION

The present invention relates to a new and improved vulcanizable rubber mixture and to a new and improved vulcanized rubber material formed from such vulcanizable rubber mixture. The present invention also relates to a new and improved method of producing rubber articles from such vulcanizable rubber mixture.

Generally speaking, the present invention is concerned with a vulcanizable rubber mixture capable of forming, during vulcanization, a durable bond between such rubber mixture and copper alloys, specifically brass or brass-coated steel. For this reason, such vulcanizable rubber mixture hereinafter will also be called "bonding mixture or system".

The functional capabilities and the service life of rubber products containing metallic strength-producing or reinforcing support means which are imbedded into an elastomeric material, such as, for example, vehicle tires, industrial hoses or conveyor belts, are dependent to a large extent upon a durable bond formed between the strength producing or reinforcing support means and the vulcanized rubber mixture surrounding the same.

As such strength producing or reinforcing support means, there are used above all brass coated steel cords which generally are not specially prepared or pretreated for this purpose. Thus the bond must be directly formed between the brass coated steel cord surface and the rubber mixture which surrounds the same, during vulcanization. For this purpose, special bonding agents are admixed to the vulcanizable rubber mixtures or so-called bonding mixtures or systems. According to the prior art, there can be differentiated in principle two bonding mixtures or systems, namely "cobalt systems" and "resorcinol resin systems". Also, combined bonding mixtures or systems, i.e. combinations of cobalt systems and resorcinol resin systems are known and also have technical or industrial significance with respect to the bonding of steel cords.

Bonding mixtures or systems employing cobalt are rich in sulfur in most cases and contain cobalt in the form of organic salts, i.e. as cobalt soaps; particularly, cobalt octoate, cobalt stearate, cobalt naphthenate and cobalt resin soaps are used. In recent times there are increasingly also employed organic cobalt boron complexes which are believed to be advantageous with respect to aging.

The classical cobalt containing bonding mixtures or systems frequently require the addition of high amounts of sulfur so that the mixing and processing operations must be carried out in a very careful manner in order to prevent the efflorescence of sulfur. In comparison with the resin based bonding mixtures or systems, the cobalt containing bonding systems have, on the one hand, the advantage of higher corrosion resistance, however, on the other hand, the disadvantage of lower resistance against oxidative aging. Furthermore, the use of cobalt containing bonding mixtures or systems may be problematic in toxicological terms because cobalt containing dust is considered to cause cancer.

The typical classical resin based bonding mixture or system contains the constituents resorcinol, hexamethylenetetramine (HEXA) and active precipitated silicic acid. Hexamethylenetetramine which, if desired, can also be used as an alkaline accelerator, has the function of a methylene donor in this composition. Together with resorcinol, there is formed during vulcanization, a resorcinol resin which not only improves the bond but also increases the tensile stress values and the hardness of the vulcanized material.

There exists a plurality of possibilities for varying the resorcinol-hexamethylenetetramine-silicic acid bonding mixture or system; among others, there are mentioned here replacing resorcinol and hexamethylenetetramine by a resorcinol-hexamethylenetetramine 1:1 complex or a resorcinol-hexamethylenetetramine-boric acid 1:1:1 complex, replacing hexamethylenetetramine by other methylene donors, for example, hexamethylolmelamine hexamethyl ether (HMMM), and replacing resorcinol by resins on a resorcinol or resorcinol derivative basis which additionally may contain other phenols or triazine derivatives. The vulcanization rate of rubber mixtures containing such resin based bonding mixtures or systems is notably lower than the vulcanization rate of rubber mixtures containing resorcinol bonding mixtures or systems. In most cases this is also true when the proportion of the vulcanization retarding silicic acid is decreased.

Vulcanizable rubber mixtures produced using the classical bonding mixture or system resorcinol-hexamethylene-tetramine-silicic acid are superior to most other resin based bonding mixtures or systems with respect to mechanical properties and initial bonding. Above all, there can be attained high elasticity and good tensile stress values at good resistance against dynamically produced fractures or ruptures in the region of the strength producing or reinforcing support means. However, a grave disadvantage of such vulcanized materials resides in the low moisture resistance of the bonding to brass. This is also true for vulcanized materials which employ the various modified hexamethylenetetramine containing bonding systems. When employing hexamethylolmelamine hexamethyl ether instead of hexamethylenetetramine, there is obtained a significantly higher moisture resistance.

During processing of rubber mixtures containing free resorcinol, the free resorcinol is problematic in toxicological terms since, during admixture, the resorcinol is driven off with the formation of white pungent fumes. The methylene donors also are not toxicologically unobjectionable because they set free formaldehyde.

SUMMARY OF THE INVENTION

Therefore, with the foregoing in mind, it is a primary object to the present invention to provide a new and improved vulcanizable rubber mixture, a new and improved vulcanized rubber material as well as a new and improved method of producing rubber articles from such vulcanizable rubber mixture and which are not afflicted with the drawbacks and shortcomings of the prior art.

It is a significant object of the present invention to provide a new and improved vulcanizable rubber mixture and a new and improved method of producing rubber articles from such vulcanizable rubber mixture and which vulcanizable rubber mixture is provided with improved bonding properties and is devoid of the disadvantages of the known bonding systems.

A further important object of the invention aims at providing a new and improved vulcanizable rubber mixture and a new and improved method of producing rubber articles from such vulcanizable rubber mixture and which vulcanizable rubber mixture is unobjectionable in toxicological terms and can be mixed and processed without problems.

A further highly significant object of the present invention is directed to the provision of a new and improved vulcanized rubber material which possesses superior bonding properties specifically to brass or brass coated steel cords, particularly after aging.

It is a still further important object of the present invention to provide a new and improved vulcanized rubber material which has superior bonding properties to brass or brass coated steel cords and which can be produced in a toxicologically unobjectionable manner and yet possesses physical properties which are at least comparable to those of vulcanized rubber materials produced by using conventional bonding mixtures.

Now in order to implement these and still further objects of the present invention which will become more readily apparent as the description proceeds, the vulcanizable rubber mixture of the present invention is manifested, among other things, by the features that, there is admixed to the vulcanizable rubber mixture a bonding additive comprising at least one monosaccharide which is selected from the group consisting of ketoses. Advantageously, such bonding additive is present in an amount of 0.2 to 15 parts by weight per 100 parts by weight rubber present in the vulcanizable rubber mixture.

According to the invention, therefore, at least one monosaccharide is employed as the bonding additive. Monosaccharides are pure organic compounds which are totally unobjectionable in toxicological terms. The effect produced by the monosaccharides, particularly ketoses as the mixture constituent producing the bond, possibly can be explained by the transformation or conversion products like, for example, furan resins or other heterocyclic resins which are formed during the vulcanization process. It still must be considered highly surprising that there is found a strong increase in the bond particularly to brass in the presence of already a comparatively small amount of ketoses. With the inventive vulcanizable rubber mixture or bonding mixture or system it is possible to attain a bonding strength which not only is comparable to the bond formed in cobalt containing vulcanizable rubber mixtures or bonding mixtures or systems but a bonding strength which, in effect, even surpasses that of cobalt containing bonding mixtures or systems. Above all, excellent values could be determined with respect to moisture resistance and oxidative aging.

It has been found particularly favorable if the monosaccharide fructose is employed as the bonding additive. Fructose has the advantage of having a melting point of 106° C. which thus is within the conventional mixing temperatures in the range of 100° C. to 115° C. for the fully compounded mixture. Furthermore, fructose can be produced on a large scale and thus is available in sufficient amounts, particularly in the form of a powder which renders the fructose admixing operation totally unproblematic.

It has further been found that the inventive vulcanizable rubber mixture does not require the admixture of organic acid, be it in the form of the free acid or in the form of the acid salts. This has a very favorable effect on the corrosion resistance of the metallic material which is imbedded into the vulcanized rubber material which is produced from the inventive vulcanizable rubber mixture. Contrary thereto, use of organic acids or their salts hardly can be dispensed with when employing the aforementioned prior art cobalt containing bonding mixtures or systems as well as the aforementioned prior art resin based bonding mixtures or systems. The cobalt containing bonding mixtures or systems, in fact, already contain a priori cobalt soaps, i.e. cobalt salts of organic acids. In resin based bonding mixtures or systems particularly the admixture of silicic acid causes high mixture viscosities which are reduced by the admixture of acids like, for example, stearic acid or zinc soap.

As indicated above, the invention is also concerned with the vulcanized rubber materials which are formed as a result of the vulcanization of the inventive vulcanizable rubber mixtures. The inventive vulcanized rubber material particularly contains reinforcing means which are imbedded into the vulcanized rubber material. Preferably, the imbedded reinforcing means are selected from reinforcing fibers, reinforcing wires or reinforcing cords containing a copper alloy. Such reinforcing fibers, wires or cords advantageously are made of brass or brass coated steel.

As alluded to above, the invention is not only concerned with the aforementioned aspects concerning the composition of the vulcanizable rubber mixture, but also relates to a new and improved method of producing rubber articles from such vulcanizable rubber mixture.

To achieve the aforementioned measures, the inventive method, in its more specific aspects, comprises the steps of:

Imbedding copper alloy based reinforcing means in the vulcanizable rubber mixture;

adding to the vulcanizable rubber mixture a bonding additive for forming a durable bond between the vulcanizable rubber mixture and the copper alloy based reinforcing means during vulcanization of the vulcanizable rubber mixture;

adding to the vulcanizable rubber mixture as the bonding additive a bonding additive containing at least one monosaccharide selected from the group of ketoses; and vulcanizing the vulcanizable rubber mixture containing the imbedded copper alloy based reinforcing means and the bonding additive and thereby forming a durable bond between the vulcanized rubber mixture and the copper alloy based reinforcing means.

The inventive method is preferably carried out using a vulcanizable rubber mixture containing imbedded reinforcing fibers, wires or cords which are made of a copper alloy. Advantageously, such copper alloy based reinforcing fibers, wires or cords are made of brass or brass coated steel.

The inventive method of producing rubber articles from the vulcanizable rubber mixture is particularly well suited for producing, for example, rubber tires, rubber conveyor belts or rubber hoses.

DETAILED DESCRIPTION OF THE PREFERRED EMBODIMENTS

In the following, there will now be described the inventive vulcanizable rubber mixture with reference to a number of examples represented in Table 1. This Table 1 shows a comparison of four vulcanizable rubber mixtures designated as test mixtures T1 to T4. Although these test mixtures T1 to T4 as such do not represent typical bonding mixtures or systems, they are particularly suitable for demonstrating the effect of the addition of fructose.

Specifically, the test mixture T1 does not contain any amount of added fructose. The test mixture T2 additionally contains 0.8 parts per weight fructose, the test mixture T3 contains 1.5 parts per weight fructose and the test mixture T4 contains 5.0 parts by weight fructose, each per 100 parts by weight rubber which is present in the vulcanizable rubber mixture. The other constituents of the test mixtures T1 to T4 are essentially the same.

TABLE 1

COMPOSITIONS AND PROPERTIES OF VULCANIZABLE RUBBER TEST MIXTURES AND VULCANIZED RUBBER MATERIALS PRODUCED THEREFROM

| Constitutents | Composition[6] | | | |
|---|---|---|---|---|
| | T1 | T2 | T3 | T4 |
| Natural rubber, masticated[1] | 80 | 80 | 80 | 80 |
| Cis-Polybutadiene rubber[2] | 20 | 20 | 20 | 20 |
| N330 (HAF) Carbon black | 60 | 60 | 60 | 60 |
| Zinc oxide | 8 | 8 | 8 | 8 |
| Stearic acid | 0.5 | 0.5 | 0.5 | 0.5 |
| Aromatic mineral oil | 5 | 5 | 5 | 5 |
| 6PPD[3] | 1 | 1 | 1 | 1 |
| D-fructose[4] | 0 | 0.8 | 1.5 | 5 |
| CBS[5] | 1 | 1 | 1 | 1 |
| Insoluble sulfur | 2.8 | 2.8 | 2.8 | 2.8 |
| Vulcametry According to German Industrial Standard DIN 53529 150° C. Göttfert Elastograph | | | | |
| $T_{10}$ [min] | 3.9 | 1.3 | 1.1 | 0.8 |
| $t_{90}$ [min] | 7.1 | 6.1 | 8.1 | 7.9 |
| Heating conditions | | | | |
| [min] | 20 | 20 | 20 | 20 |
| [°C.] | 150 | 150 | 150 | 150 |
| Tensile Test According to German Industrial Standard DIN 53504 | | | | |
| Strength [MPa] | 21.6 | 22.0 | 21.4 | 20.9 |
| Elongation at rupture [%] | 360 | 351 | 365 | 400 |
| Tensile stress at 50% [MPa] | 2.2 | 2.2 | 2.1 | 1.9 |
| Tensile stress at 150% [MPa] | 8.3 | 8.4 | 8.0 | 6.1 |
| Tensile stress at 300% [MPa] | 19.7 | 20.0 | 18.4 | 15.1 |
| Shore Hardness A According to German Industrial Standard DIN 53505 | 72 | 71 | 72 | 72 |
| Rebound Resilience According to German Industrial Standard DIN 53512 [%] | 50 | 49 | 49 | 47 |
| Tearing Test According to German Industrial Standard DIN 53515 [N/mm] | 16 | 24 | 28 | 26 |
| Static Adhesion Test CSRC[7] Steel Cord Rubber (34'/150° C.) | | | | |
| Unaged | | | | |
| Adhesion [N] | 112 | 148 | 156 | 151 |
| Coverage [grade][7] | 3 | 2 | 2 | 2 |
| 7 days aging, 100° C., air | | | | |
| Adhesion [N] | 86 | 87 | 102 | 107 |
| Coverage [grade][7] | 2–3 | 2 | 2 | 2 |
| 21 days aging, 70° C., 100% relative humidity | | | | |
| Adhesion [N] | 77 | 98 | 115 | 116 |
| Coverage [grade][7] | 4–5 | 2 | 2 | 2 |

Explanations:
[1]Standard sheet 3, crude, mechanically degraded
[2]Cariflex 1220 (Shell); cobalt catalyst
[3]N-(1,3-Dimethylbutyl)-N'-phenyl-p-phenylenediamine, aging and ozone protective agent
[4]Fructan, finely crystallized, food grade (Laevosan GmbH, Linz, Austria)
[5]Benzothiazyl-2-cyclohexylsuflene amide, accelerator
[6]Parts by weight per 100 parts by weight rubber present in the vulcanizable rubber test mixture
[7]Improved Wire Adhesion Test, CSRC Method, see below.

Regarding the aforenoted adhesion test carried out on the four test mixtures T1 to T4, this steel cord static adhesion test was carried out using brass coated wire produced in accordance with the normal copper coating method. For carrying out this test, there was employed a non-standard testing method which insures very good reproducability of the results. Specifically, this non-standard test method is the so-called CSRC method as described in a publication by A. E. Hicks et al, entitled "An Improved Wire Adhesion Test Method", published in Rubber Chemistry and Technology, Vol. 45/1 (1972), pp. 26–48. This CSRC method was used in a slightly modified manner and the data of interest are as follows:

| Test Body: | |
|---|---|
| Imbedding length | 20 mm |
| Block height | 12 mm inclusive of a 1 mm thick primed steel plate on each end face |
| Brass coated steel cord | 3 + 9 + 15 × 0.22 + 1 × 0.15 Baekert brass coated, 67% copper |
| Cord number | 18 |
| Withdrawal rate | 50 mm/min |
| Number of test cords | 5 |
| Adhesion | there is given the maximum tear-out force in [N] |
| Coverage | the rubber coverage of the brass coated steel cord is classified in terms of grades 1–5 which have the following meaning: |
| Grade 1: | full rubber coverage in the adhesion zone |
| Grade 2: | with the exception of sporadic naked spots, full rubber coverage of the cord ply adjoining the rubber; possibly naked coil returns |
| Grade 3: | localized naked cord spots in a maximum amount of about 40% of the adhesion zone |
| Grade 4: | localized naked cord spots in a maximum amount of about 50% of the adhesion zone |
| Grade 5: | more than 90% naked brass coated steel cord surface |

As will be apparent from Table 1, already in the unaged condition the tear-out force required for the vulcanized rubber materials obtained from the vulcanizable rubber test mixtures T2, T3 and T4 is higher to an appreciable extent as compared to the tear-out force required for the vulcanized rubber material obtained from the vulcanizable rubber test mixture T1. After seven days of aging in air at 100° C., particularly the values obtained for the vulcanized rubber material produced from the vulcanizable rubber test mixture T3 show a substantial improvement as compared to the vulcanized rubber material obtained from the vulcanizable rubber test mixture T1. After 21 days of aging at 70° C. and 100% relative humidity, the vulcanized rubber materials obtained from the vulcanizable rubber test mixtures T3 and T4 reach static adhesion test values comparable to the adhesion or bonding which is obtained for steel cords when using excellent vulcanizable rubber mixtures or bonding mixtures or systems. Even the static adhesion test values of the vulcanized rubber material obtained from the vulcanizable rubber test mixture T2 is notably better than the value of the vulcanized rubber material obtained from the vulcanizable rubber test mixture T1.

When comparing further properties of the test mixtures T1 to T4, the fructose admixture conspicuously shortens the initial phase of the vulcanization process. With regard to the physical properties of the vulcanized rubber materials it is noted that, due to the fructose addition, the tearing test is distinctly positively affected which is highly significant with respect to, for example, the known problem of belt edge loosening in radial-ply tires. Otherwise, when neglecting a small but significant reduction in the rebound resilience, the added fructose proportion does not cause substantial changes in the physical properties.

While dosages higher than 5 parts by weight fructose per 100 parts by weight rubber present in the vulcanizable rubber mixture are possible, such higher dosages hardly result in any advantages with respect to the adhesion or tearing tests. Dosages in excess of 15 parts by weight fructose per 100 parts by weight rubber should be avoided because such dosages, in addition to a high decrease of the cross-linking density, would result in an extensive loss of initial adhesion or bonding.

The following Table 2 represents a comparison of further vulcanizable rubber mixtures and the vulcanized rubber materials produced therefrom:

TABLE 2

COMPOSITIONS AND PROPERTIES OF VULCANIZABLE RUBBER TEST MIXTURES AND VULCANIZED RUBBER MATERIALS OBTAINED THEREFROM

| Constituents | Composition[14] | | |
|---|---|---|---|
| | M1 | M2 | M3 |
| Natural rubber, masticated[1] | 100 | 50 | 80 |
| Isoprene rubber[2] | | 50 | 20 |
| N 330 (HAF) Carbon black | 45 | | |
| N 326 (HAF-LS) Carbon black | | 60 | 65 |
| Active precipitated silicic acid[3] | 15 | | |
| Zinc oxide | 5 | 8 | 8 |
| Stearic acid | 2 | 1.3 | |
| Aromatic mineral oil | 6.2 | | 5 |
| Tackifier[4] | | 2 | 2 |
| IPPD[5] | | 1 | 1 |
| TMQ[6] | 1 | 1 | |
| Resorcinol | 1.5 | | |
| Cobalt naphthenate, 11% Co[7] | | 2.5 | |
| D-fructose[8] | | | 1.8 |
| HMMM[9] | 1.5 | | |
| TBBS[10] | 1.25 | | |
| DCBS[11] | | 0.7 | |
| CBS[12] | | | 2 |
| Insoluble sulfur | 4.8 | 6.7 | 4 |
| CTP[13] | 0.2 | 0.15 | |
| Heating conditions | | | |
| [min] | 20 | 20 | 20 |
| [°C.] | 150 | 150 | 150 |
| Tensile Test According to German Industrial Standard DIN 53504 | | | |
| Strength [MPa] | 16.8 | 16.4 | 18.6 |
| Elongation at rupture [%] | 275 | 301 | 355 |
| Tensile stress at 50% [MPa] | 2.6 | 3.1 | 2.2 |
| Tensile stress at 150% [MPa] | 9.0 | 8.8 | 7.1 |
| Tensile stress at 300% [MPa] | 19.8 | 18.0 | 17.1 |
| Shore Hardness A According to German Industrial Standard DIN 53505 | 76 / 45 | 79 / 40 | 74 / 45 |
| Rebound Resilience According to German Industrial Standard DIN 53512 [%] | 21 | 19 | 19 |
| Tearing Test According to German Industrial Standard DIN 53515 [N/mm] | 21 | 19 | 19 |
| Static Adhesion Test CSRC[15] Steel Cord Rubber (34'/150° C.) | | | |
| Unaged | | | |
| Adhesion [N] | 135 | 161 | 152 |
| Coverage [grade][15] | 3 | 1-2 | 2 |
| 14 days aging, 70° C., 100% relative humidity | | | |
| Adhesion [N] | 64 | 92 | 105 |

TABLE 2-continued

COMPOSITIONS AND PROPERTIES OF VULCANIZABLE RUBBER TEST MIXTURES AND VULCANIZED RUBBER MATERIALS OBTAINED THEREFROM

| Constituents | Composition[14] | | |
|---|---|---|---|
| | M1 | M2 | M3 |
| Coverage [grade][15] | 4 | 3 | 2 |

Explanations:
[1]Standard sheet 3, crude, mechanically degraded
[2]Natsyn 2200 (Goodyear); titanium catalyst
[3]Ultrasil VN3 (Degussa)
[4]Condensation product of p-tert.-butylphenol and acetylene (BASF)
[5]N-Isopropyl-N'-phenyl-p-phenylenediamine, aging and ozone protective agent
[6]2,2,4-Trimethyl-1,2-dihydroquinoline, aging protective agent
[7]Soligen, 11% cobalt (Borchers)
[8]Fructan, finely crystallized, food grade (Laevosan GmbH, Linz, Austria)
[9]Cyrez 963 (Cyanamide); hexamethylolmelamine hexamethyl ether
[10]Benzothiazyl-2-tert.-butylsulfene amide (accelerator)
[11]Benzothiazyl-2-dicyclohexylsulfene amide (accelerator)
[12]Benzothiazyl-2-cylclohexylsulfene amide (acceleartor)
[13]Cyclohexylthiophthalimide (retarder)
[14]Parts by weight per 100 parts by weight rubber present in the vulcanizable rubber test mixture
[15]See the explanation following Table 1

The vulcanizable rubber test mixture M1 constitutes a prior art vulcanizable rubber mixture or bonding mixture or system containing hexamethylolmelamine hexamethyl ether; such mixture is described in a publication by M. P. Wagner and N. N. Hewitt, entitled "Mixture Preparation for Dynamic Adhesion of Rubber to Steel Cord", published in "Kautschuk, Gummi, Kunststoffe" Vol. 37 (1984), pp. 688-693. The vulcanizable rubber test mixture M2 constitutes a conventional vulcanizable rubber mixture or bonding mixture or system containing cobalt naphthenate; such mixture is described in a publication by J. Spring and K. Burmester, entitled "Steel Cord Bonding Mixtures - Development, Testing, Evaluation", published in "Kautschuk, Gummi, Kunststoffe, Vol. 33 (1980), pp. 611-616. Such vulcanizable rubber mixtures are typically used, for example, as belt press-on mixtures for vehicle tires. The test mixture M3 constitutes an exemplary embodiment of the inventive vulcanizable rubber mixture containing fructose added thereto. With regard to the physical properties of the vulcanized rubber material obtained from the aforementioned vulcanizable rubber test mixtures M1 to M3, the following is noted with reference to Table 2:

The static adhesion test is again carried out according to the aforenoted CSRC method with respect to brass coated steel cords which are brass coated in accordance with the normal copper coating method. The testing conditions substantially correspond to the testing conditions mentioned hereinbefore with reference to Table 1.

In the unaged condition, the adhesion of the vulcanized rubber material produced from the vulcanizable rubber test mixture M2 was slightly better than the adhesion of the vulcanized rubber material produced from the inventive vulcanizable rubber test mixture M3. However, the adhesion of the vulcanized rubber material obtained from the inventive vulcanizable rubber test mixture M3 was distinctly improved over the adhesion of the vulcanized rubber material produced from the vulcanizable rubber test mixture M1. After 14 days of aging at 70° C. and 100% relative humidity, the adhesion of the vulcanized rubber material obtained from the inventive vulcanizable rubber test mixture M3 was unequivocally superior over that of the vulcanized rubber materials produced from the conventional vulcanizable rubber test mixtures M1 and M2. The tear-out force was determined as 105 N at a coverage grade 2 which classification grade was explained hereinbefore with reference to Table 1 and which can be designated as very good.

For the inventive vulcanizable rubber mixture or bonding mixture or system there can be readily employed other types of rubber which are usually used in bonding mixtures or systems according to the state of the art. However, it has been found to be favorable to admix to the inventive vulcanizable rubber mixture or bonding mixtures or system certain accelerators like, for example, CBS, DCBS, TBBS as noted in Table 2, particularly in an amount in the range of 0.5 to 5 parts by weight per 100 parts weight rubber present in the inventive vulcanizable rubber mixture.

It is a further advantage that in the inventive vulcanizable rubber mixtures or bonding mixtures or systems, there can be run without the admixture of organic acids, be the admixture in the form of the free acid or in the form of acid salts. This has a favorable effect on the corrosion resistance of the metallic reinforcing elements which are imbedded into the thus formed inventive vulcanized rubber material.

Preferably, the fructose is admixed at a mixing temperature selected above 105° C. so that the fructose can melt. During admixture into the fully compounded mixture, the mixing temperature should not exceed 130° C. and particularly should be in the range of about 118° C. to 120° C. The fructose may also be admixed to the auxiliary mixture, i.e. a mixture which is produced at an earlier stage of the mixing operation and does not yet contain cross-linking agents and additives like sulfur and accelerators; then, the maximum mixing temperature may be somewhat higher, however, should not exceed temperatures of approximately 160° C.

In principle, other monosaccharides selected from the group of ketoses are also suitable for use as the bonding additive. Sorbose or mixtures of fructose and sorbose offer themselves as such bonding additives. While other ketoses can be employed, there may exist the problem that sufficient amounts of these ketoses are hardly available.

The use of the inventive vulcanizable rubber mixtures is particularly important in connection with the production of vehicle tires. In this realm, the inventive vulcanizable rubber mixtures offer themselves for use as press-on mixtures for the belt plys or radial plys and result in great advantages with the view of the high dynamic and thermal stresses as well as the corrosive conditions existing during the use of such tires. During production of conveyor belts as well as industrial hoses, there is frequently encountered the problem that the metallic reinforcing elements must be bonded in a particularly durable manner. Also in these cases it is especially advantageous to employ vulcanizable rubber mixtures produced in accordance with the invention.

While there are shown and described present preferred embodiments of the invention, it is to be distinctly understood that the invention is not limited thereto, but may be otherwise variously embodied and practiced within the scope of the following claims.

ACCORDINGLY, WHAT I CLAIM IS:

1. A vulcanizable rubber mixture comprising:
   a bonding additive for forming a durable bond between the vulcanizable rubber mixture and copper alloys during vulcanization of the vulcanizable rubber mixture; and
   said bonding additive containing at least one monosaccharide selected from the group of ketoses.

2. The rubber mixture as defined in claim 1, wherein:
   said vulcanizable rubber mixture contains said at least one monosaccharide in an amount in the range 0.2 to 15 parts by weight per 100 parts by weight rubber present in the vulcanizable rubber mixture.

3. The rubber mixture as defined in claim 2, wherein:
   the vulcanizable rubber mixture contains said at least one monosaccharide up to a maximum amount of 6 parts by weight per 100 parts by weight rubber present in the vulcanizable rubber mixture.

4. The rubber mixture as defined in claim 1, wherein:
   said at least one monosaccharide consists essentially of fructose.

5. The rubber mixture as defined in claim 1, wherein:
   said at least one monosaccharide consists essentially of a mixture of ketoses containing fructose.

6. The rubber mixture as defined in claim 5, wherein:
   said mixture consists essentially of a mixture of fructose and sorbose.

7. The rubber mixture as defined in claim 1, wherein:
   the vulcanizable rubber mixture is essentially free of organic acids and organic acid salts.

8. The rubber mixture as defined in claim 1, further including:
   at least one accelerator;
   said accelerator being selected from the group consisting of benzothiazyl-2-cyclohexylsulfene amide, benzothiazyl-2-dicyclohexylsulfene amide and benzothiazyl-2-tert.-butylsulfene amide; and
   said accelerator being present in the vulcanizable rubber mixture in an amount in the range 0.5 to 5 parts by weight per 100 parts by weight of rubber present in the vulcanizable rubber mixture.

9. A vulcanized rubber material comprising:
   a vulcanized rubber mixture containing an additive for forming a durable bond between the vulcanized rubber mixture and a copper alloy present in said vulcanized rubber mixture;
   said bonding additive, prior to vulcanization, containing at least one monosaccharide selected from the group of ketoses; and
   reinforcing means imbedded in said vulcanized rubber mixture and containing said copper alloy.

10. The vulcanized rubber material as defined in claim 9, wherein:
    said reinforcing means being selected from the group consisting of reinforcing fibers, reinforcing wires and reinforcing cords containing said copper alloy.

11. The vulcanized rubber material as defined in claim 9, wherein:
    said reinforcing means constitute brass reinforcing means.

12. The vulcanized rubber material as defined in claim 9, wherein:
    said reinforcing means constitute brass coated steel.

13. A method of producing rubber articles from a vulcanizable rubber mixture, comprising the steps of:
    imbedding copper alloy based reinforcing means in the vulcanizable rubber mixture;
    adding to said vulcanizable rubber mixture a bonding additive for forming a durable bond between said vulcanizable rubber mixture and said copper alloy based reinforcing means during vulcanization of said vulcanizable rubber mixture;
    said step of adding said bonding additive to said vulcanizable rubber mixture entailing the step of adding to said vulcanizable rubber mixture a bonding additive containing at least one monosaccharide selected from the group of ketoses; and vulcanizing said vulcanizable rubber mixture containing said imbedded copper alloy based reinforcing means and said bonding additive and thereby forming a durable bond between the vulcanized rubber mixture formed from said vulcanizable rubber mixture and said copper alloy based reinforcing means.

14. The method as defined in claim 13, wherein:
said step of adding said at least one monosaccharide to said vulcanizable rubber mixture entails adding said at least one monosaccharide in an amount in the range of 0.2 to 15 parts by weight per 100 parts by weight rubber present in said vulcanizable rubber mixture.

15. The method as defined in claim 14, wherein:
said step of adding said at least one monosaccharide to said vulcanizable rubber mixture entails adding said at least one monosaccharide in a maximum amount of up to 6 parts by weight per 100 parts by weight rubber present in said vulcanizable rubber mixture.

16. The method as defined in claim 13, wherein:
said step of adding said at least one monosaccharide to said vulcanizable rubber mixture entails selecting fructose as said at least one monosaccharide.

17. The method as defined in claim 13, wherein:
said step of adding said at least one monosaccharide to said vulcanizable rubber mixture entails selecting a fructose containing mixture of ketoses as said at least one monosaccharide.

18. The method as defined in claim 17, wherein:
said step of selecting said fructose containing mixture of ketoses entails selecting a mixture of fructose and sorbose.

19. The method as defined in claim 13, further including the step of:
selecting as said vulcanizable rubber mixture, a vulcanizable rubber mixture essentially free of organic acids and organic acid salts.

20. The method as defined in claim 13, further including the steps of:
adding to said vulcanizable rubber mixture at least one accelerator;
selecting said at least one accelerator from the group consisting of benzothiazyl-2-cyclohexylsulfene amide, benzothiazyl-2-dicyclohexylsulfene amide and benzothiazyl-2-tert.-butylsulfene amide; and
said step of adding said at least one accelerator to said vulcanizable rubber mixture entailing the step of adding said accelerator in an amount in the range 0.5 to 5 parts by weight per 100 parts by weight rubber present in said vulcanizable rubber mixture.

21. The method as defined in claim 13, wherein:
said step of imbedding said copper alloy based reinforcing means in said vulcanizable rubber mixture entails selecting said copper alloy based reinforcing means from the group consisting of reinforcing fibers, reinforcing wires and reinforcing cords.

22. The method as defined in claim 13, wherein:
said step of imbedding said copper alloy based reinforcing means in said vulcanizable rubber mixture entails selecting said copper alloy based reinforcing means from the group consisting of brass reinforcing means and brass coated steel reinforcing means.

23. The method as defined in claim 13, further including the step of:
producing rubber articles selected from the group consisting of rubber tires, rubber conveyor belts and rubber hoses from said vulcanizable rubber mixture.

* * * * *